United States Patent
Eddy et al.

(10) Patent No.: US 10,771,153 B2
(45) Date of Patent: Sep. 8, 2020

(54) OPTICAL POWER MEASUREMENT APPARATUS

(71) Applicant: AFL TELECOMMUNICATIONS LLC, Duncan, SC (US)

(72) Inventors: Dale C. Eddy, Gilford, NH (US); Scott H. Prescott, Belmont, NH (US)

(73) Assignee: AFL TELECOMMUNICATIONS LLC, Duncan, SC (US)

( * ) Notice: Subject to any disclaimer, the term of this patent is extended or adjusted under 35 U.S.C. 154(b) by 0 days.

(21) Appl. No.: 16/592,273

(22) Filed: Oct. 3, 2019

(65) Prior Publication Data
US 2020/0036441 A1   Jan. 30, 2020

Related U.S. Application Data

(63) Continuation-in-part of application No. 15/634,557, filed on Jun. 27, 2017, now abandoned.

(51) Int. Cl.
*H04B 10/079* (2013.01)
*H04J 14/02* (2006.01)

(52) U.S. Cl.
CPC .... *H04B 10/07955* (2013.01); *H04J 14/0221* (2013.01)

(58) Field of Classification Search
None
See application file for complete search history.

(56) References Cited

U.S. PATENT DOCUMENTS

| | | |
|---|---|---|
| 5,382,986 A | 1/1995 | Black |
| 5,926,590 A | 7/1999 | Mao |
| 5,949,560 A | 9/1999 | Roberts |
| 5,986,782 A | 11/1999 | Alexander |
| 6,014,248 A | 1/2000 | Kobayashi |
| 6,169,616 B1 * | 1/2001 | Cao ............ H04J 14/0208 398/9 |
| 6,392,769 B1 | 5/2002 | Ford |
| 6,624,926 B1 | 9/2003 | Hayashi |

(Continued)

OTHER PUBLICATIONS

AFL Telecommunications LLC; International Patent Application No. PCT/US2018/0327201; International Search Report; dated Aug. 20, 2018; (2 pages).

*Primary Examiner* — Li Liu
(74) *Attorney, Agent, or Firm* — Dority & Manning, P.A.

(57) ABSTRACT

An apparatus for measuring optical power includes a first component configured to at least one of multiplex or demultiplex between a first composite optical waveguide and at least a first intermediate optical waveguide and a second intermediate optical waveguide. The apparatus further includes a second component configured to at least one of multiplex or demultiplex between a second composite optical waveguide and at least the first intermediate optical waveguide and the second intermediate optical waveguide. The first and second components have complimentary isolation levels. The apparatus further includes a first optical coupler positioned along the first intermediate optical waveguide and a second optical coupler positioned along the second intermediate optical waveguide. The apparatus further includes a first photodetector, a second photodetector, a first measurement device, and a second measurement device.

19 Claims, 3 Drawing Sheets

(56) References Cited

U.S. PATENT DOCUMENTS

| | | |
|---|---|---|
| 6,657,952 B1 * | 12/2003 | Shimomura ........ H04J 14/0212 370/223 |
| 6,850,360 B1 | 2/2005 | Chen |
| 6,882,466 B1 | 4/2005 | Shimojoh |
| 7,187,861 B2 | 3/2007 | Ruchet |
| 7,233,742 B2 | 6/2007 | Hoshida |
| 7,756,418 B2 | 7/2010 | Ofalt et al. |
| 8,971,700 B2 | 3/2015 | Sakamoto |
| 9,602,200 B2 | 3/2017 | Eddy et al. |
| 9,831,948 B2 | 11/2017 | Ruchet et al. |
| 2002/0041429 A1 | 4/2002 | Sugaya |
| 2002/0126958 A1 | 9/2002 | Maigne |
| 2002/0131116 A1 * | 9/2002 | Shimomura ........ H04J 14/0241 398/83 |
| 2003/0099265 A1 | 5/2003 | Harker |
| 2003/0152319 A1 | 8/2003 | Munks |
| 2003/0175029 A1 * | 9/2003 | Harney ............... H04J 14/0213 398/83 |
| 2003/0214985 A1 | 11/2003 | Harker |
| 2004/0004756 A1 | 1/2004 | Hainberger |
| 2005/0185959 A1 | 8/2005 | Kinoshita |
| 2005/0226621 A1 | 10/2005 | Kikuchi |
| 2005/0286895 A1 * | 12/2005 | Lee .................... H04J 14/0282 398/79 |
| 2006/0023298 A1 | 2/2006 | Ohshima |
| 2006/0072918 A1 | 4/2006 | Gerstel |
| 2006/0198634 A1 * | 9/2006 | Ofalt .................... H04B 10/077 398/16 |
| 2009/0212769 A1 | 8/2009 | Stoica |
| 2012/0050845 A1 | 3/2012 | Lange |
| 2012/0219285 A1 * | 8/2012 | Dahan ............. H04B 10/07953 398/26 |
| 2012/0321299 A1 | 12/2012 | Oguma |
| 2013/0107347 A1 | 5/2013 | Chau |
| 2013/0330073 A1 * | 12/2013 | Sakamoto ............. H04B 10/07 398/38 |
| 2014/0140691 A1 * | 5/2014 | Reaves .................. H04B 10/07 398/21 |
| 2015/0010302 A1 * | 1/2015 | Eddy .................... H04J 14/0252 398/34 |
| 2016/0099772 A1 | 4/2016 | Mesh |
| 2017/0363813 A1 | 12/2017 | Lee |
| 2018/0076890 A1 | 3/2018 | Ruchet et al. |

* cited by examiner

OPTICAL POWER MEASUREMENT APPARATUS

This application is a continuation in part of U.S. patent application Ser. No. 15/634,557, filed on Jun. 27, 2017, the disclosure of all of which is incorporated by reference herein in it entirety.

FIELD

The present disclosure relates generally to apparatus for measuring power levels in optical communications systems such as passive optical networks.

BACKGROUND

Measuring the power levels of an operating optical communications system, specifically a passive optical network ("PON"), like those used in fiber to the "X" (X: H=home, C=curb, N=node, P=premises, etc.) configurations, Optical Local Area Networks ("OLANs"), or coarse wavelength division multiplexing ("CWDM") systems, requires the use of an inline power meter capable of sampling and measuring a small portion of the total optical power of each wavelength present in the optical fiber.

Known methods and apparatus for such power measurement initially tap a portion of the signal, and then separate out the various wavelengths for power measurement thereof. However, these configurations are very complex, and can add loss of signal level at each stage before detection and measurement, limiting the dynamic range of the measurement circuits. Also, these configurations can take up a considerable amount of space inside the instrument designed to measure the optical power levels, adding to the cost of those instruments.

Other known methods and apparatus separate out the wavelengths and then utilize tap photodetectors to sample portions of the signals for power measurement thereof. However, the use of tap photodetectors can, in some cases, be expensive and cumbersome.

Accordingly, improved apparatus for performing optical power measurements is desired.

BRIEF DESCRIPTION

Aspects and advantages of the invention will be set forth in part in the following description, or may be obvious from the description, or may be learned through practice of the invention.

In accordance with one embodiment, an apparatus for measuring optical power is provided. The apparatus includes a first component configured to at least one of multiplex or demultiplex between a first composite optical waveguide and at least a first intermediate optical waveguide and a second intermediate optical waveguide. The first intermediate optical waveguide carries a first optical signal associated with a first wavelength, and the second intermediate optical waveguide carries a second optical signal associated with a second wavelength different from the first wavelength. The first component provides isolation levels comprising a first isolation level at the first wavelength and a second isolation level different from the first isolation level at the second wavelength. The apparatus further includes a second component configured to at least one of multiplex or demultiplex between a second composite optical waveguide and at least the first intermediate optical waveguide and the second intermediate optical waveguide. The second component provides isolation levels which are complementary to the isolation levels of the first component. The apparatus further includes a first optical coupler positioned along the first intermediate optical waveguide, the first optical coupler configured to split a portion of the first optical signal from the first intermediate optical waveguide. The apparatus further includes a second optical coupler positioned along the second intermediate optical waveguide, the second optical coupler configured to split a portion of the second optical signal from the second intermediate optical waveguide. The apparatus further includes a first photodetector in optical communication with the first optical coupler to receive the portion of the first optical signal split from the first intermediate optical waveguide. The apparatus further includes a second photodetector in optical communication with the second optical coupler to receive the portion of the second optical signal split from the second intermediate optical waveguide. The apparatus further includes a first measurement device configured to measure the first optical signal from the first photodetector. The apparatus further includes a second measurement device configured to measure the second optical signal from the second photodetector.

In accordance with another embodiment, an apparatus for measuring optical power is provided. The apparatus includes a first combination multiplexer and demultiplexer component in optical communication between a first composite optical waveguide and at least a first intermediate optical waveguide and a second intermediate optical waveguide. The first intermediate optical waveguide carries a first optical signal associated with a first wavelength in a first direction, and the second intermediate optical waveguide carries a second optical signal associated with a second wavelength different from the first wavelength in a second direction that is opposite to the first direction. The first combination multiplexer and demultiplexer component provides isolation levels comprising a first isolation level at the first wavelength and a second isolation level different from the first isolation level at the second wavelength. The apparatus further includes a second combination multiplexer and demultiplexer component in optical communication between a second composite optical waveguide and at least the first intermediate optical waveguide and the second intermediate optical waveguide. The second combination multiplexer and demultiplexer component provides isolation levels which are complementary to the isolation levels of the first component. The apparatus further includes a first optical coupler positioned along the first intermediate optical waveguide, the first optical coupler configured to split a portion of the first optical signal from the first intermediate optical waveguide. The apparatus further includes a second optical coupler positioned along the second intermediate optical waveguide, the second optical coupler configured to split a portion of the second optical signal from the second intermediate optical waveguide. The apparatus further includes a first photodetector in optical communication with the first optical coupler to receive the portion of the first optical signal split from the first intermediate optical waveguide, the first photodetector including a band-pass filter. The apparatus further includes a second photodetector in optical communication with the second optical coupler to receive the portion of the second optical signal split from the second intermediate optical waveguide, the second photodetector including a band-pass filter. The apparatus further includes a first measurement device configured to measure the first optical signal from the first photodetector. The apparatus further includes a second measurement device configured to measure the second optical signal from the second photodetector.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The detailed description uses numerical designations to refer to features in the drawings. Like or similar designations in the drawings and description have been used to refer to like or similar parts of the technology. As used herein, the terms "first," "second," "third," "fourth," etc. may be used interchangeably to distinguish one component from another and are not intended to signify location, importance, number, or sequence of the individual components.

The present disclosure is generally directed to apparatus for measuring optical power levels. More specifically, such apparatus may measure power levels in operating optical communications systems, such as PONs. Rather than tapping the optical signal before splitting out various wavelengths for power measurement, such apparatus in accordance with the present disclosure advantageously first split out the various wavelengths using, for example, multiplexers, demultiplexers, and/or combination multiplexer/demultiplexers. Further, optical couplers may be provided on the intermediate optical waveguides through which the various split-out wavelengths are carried. A portion of each optical signal carried through each intermediate optical waveguide may be split out by such coupler for power measurement. The split out optical signals may be provided to photodetectors which are in communication with measurement devices for power measurement of the optical signals.

The use of optical couplers and photodetectors in accordance with the present disclosure provides numerous advantages. For example, apparatus in accordance with the present disclosure can be utilized with a variety of wavelength sets, including for example Coarse Wavelength Division Multiplexing ("CWDM") wavelength sets, Dense Wavelength Division Multiplexing ("DWDM") wavelength sets, or other wavelength sets on single mode network systems, or Wideband Multimode Fiber ("WBMMF") systems or LX.4 systems, such as on either singlemode or multimode optical fibers. Filters can be easily incorporated into the photodetectors to facilitate such uses. Additionally, such apparatus are relatively less complex and less expensive relative to known optical power measurement apparatus.

Referring now to FIGS. 1 through 5, various embodiments of such apparatus 10 are illustrated. As shown, apparatus 10 includes a first component 20 which is configured to at least one of multiplex or demultiplex between a first composite optical waveguide 12 and a plurality of intermediate optical waveguides. Apparatus 10 further includes a second component 22 which is configured to at least one of multiplex or demultiplex between a second composite optical waveguide 14 and the plurality of intermediate optical waveguides.

In exemplary embodiments, the optical waveguides as discussed herein are optical fibers. Alternatively, however, the optical waveguides may be silica channel or free-space optics, or other suitable optical waveguides.

The first composite optical waveguide 12 may be connected to a port 13, such as an optical line termination ("OLT") port. The second composite optical waveguide 14 may be connected to a port 15, such as a network interface device ("NID") port 15. In exemplary embodiments, the port 15 may be an optical network terminal ("ONT") port. Accordingly, optical signals may flow through the optical waveguides 12, 14 in one or more directions and at various wavelengths.

First component 20 may, in exemplary embodiments, be a combination multiplexer and demultiplexer component 20. Similarly, second component 22 may, in exemplary embodiments, be a combination multiplexer and demultiplexer component 22. In these cases, the first component 20 and/or second component 22 may be configured to both multiplex and demultiplex between the first/second optical waveguide 12, 14 and the intermediate optical waveguides. Alternatively, the first component 20 may be a multiplexer and the second component 22 a demultiplexer, or vice versa, such that the first component 20 and/or second component 22 is configured to multiplex or demultiplex between the first/second optical waveguide 12, 14 and the intermediate optical waveguides.

In some embodiments, the multiplexer, demultiplexer, or combination multiplexer and demultiplexer of the first component 20 and/or second component 22 may be a filter wavelength division multiplexer, demultiplexer, or combination multiplexer and demultiplexer. Alternatively, the multiplexer, demultiplexer, or combination multiplexer and demultiplexer of the first component 20 and/or second component 22 may be an arrayed wavelength grating multiplexer, demultiplexer, or combination multiplexer and demultiplexer. Alternatively, other suitable multiplexers, demultiplexers, or combination multiplexer and demultiplexers may be utilized.

Between the first component 20 and the second component 22, a plurality of intermediate optical waveguides are provided. The intermediate optical waveguides may thus be connected to and between the first component 20 and the second component 22. The plurality of intermediate optical waveguides 20 may include, for example, a first intermediate optical waveguide 30, a second intermediate optical waveguide 32, a third intermediate optical waveguide 34, and/or a fourth intermediate optical waveguide 36. Two, three, four, or more intermediate optical waveguides may be provided. Each intermediate optical waveguide may carry an optical signal associated with one or more different wavelengths. Further, such optical signals may be travelling in the same or different directions, such as in a direction from first component 20 towards second component 22 or in a direction from second component 22 towards first component 20.

Figure 1:
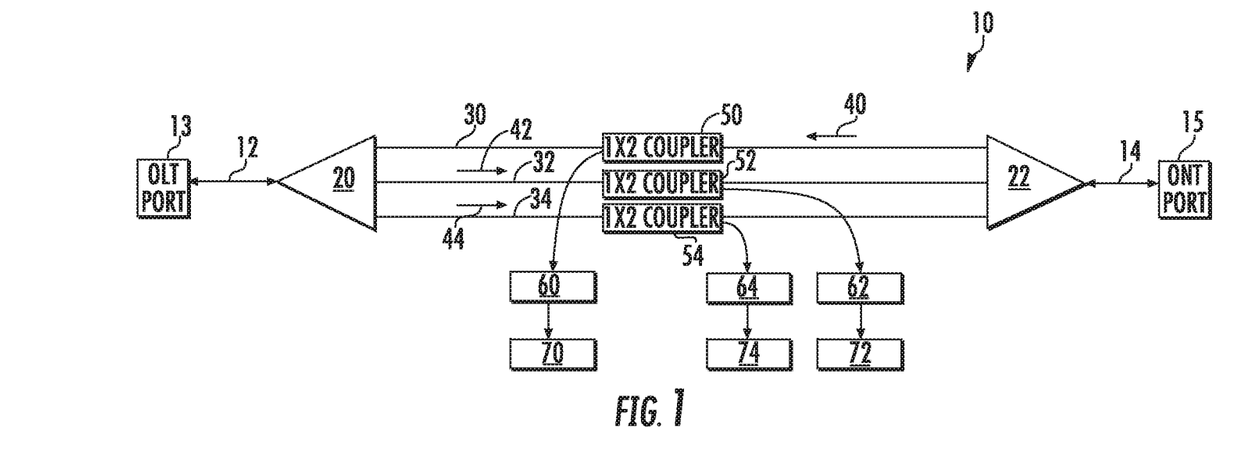
FIG. 1 is a schematic illustration of an apparatus for measuring optical power in accordance with embodiments of the present disclosure.

For example, in some embodiments as illustrated in FIG. 1, a first optical signal 40 associated with a first wavelength may be carried by the first intermediate optical waveguide 30 in a first direction. A second optical signal 42 associated with a second wavelength different from the first wavelength may be carried by the second intermediate optical waveguide 32 in a second direction opposite the first direction. A third optical signal 44 associated with a third wavelength different from the first wavelength and the second wavelength may be carried by the third intermediate optical waveguide 34 in the second direction.

Figure 2:
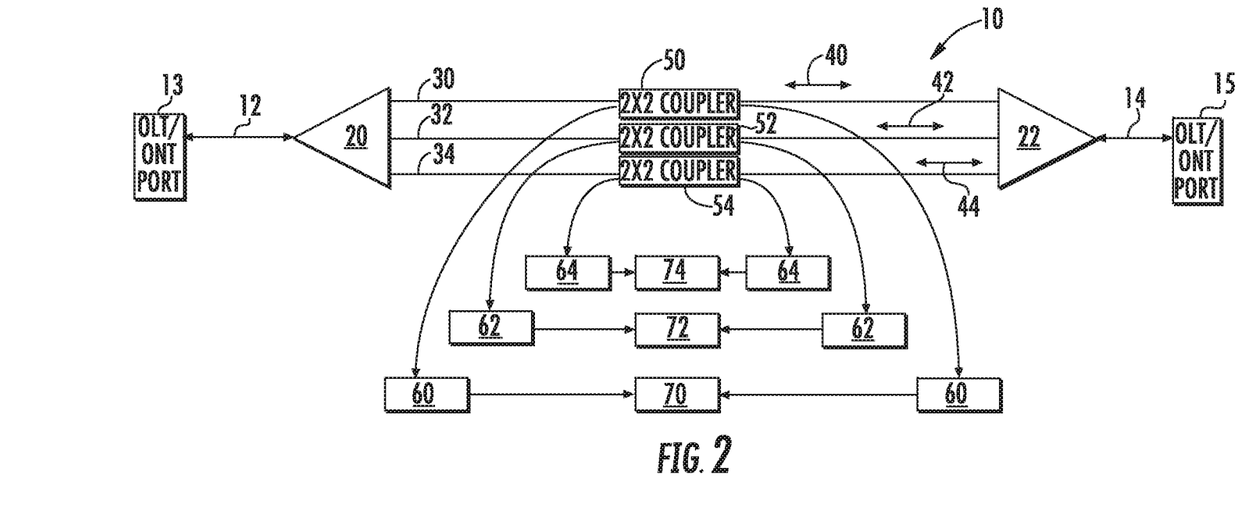
FIG. 2 is a schematic illustration of an apparatus for measuring optical power in accordance with other embodiments of the present disclosure.

In another embodiment, as illustrated in FIG. 2, a first optical signal 40 associated with a first wavelength may be carried by the first intermediate optical waveguide 30 in a first direction and/or second direction opposite the first direction. A second optical signal 42 associated with a second wavelength different from the first wavelength may be carried by the second intermediate optical waveguide 32 in the first direction and/or second direction. A third optical signal 44 associated with a third wavelength different from the first wavelength and the second wavelength may be carried by the third intermediate optical waveguide 34 in the first direction and/or the second direction.

Figure 3:
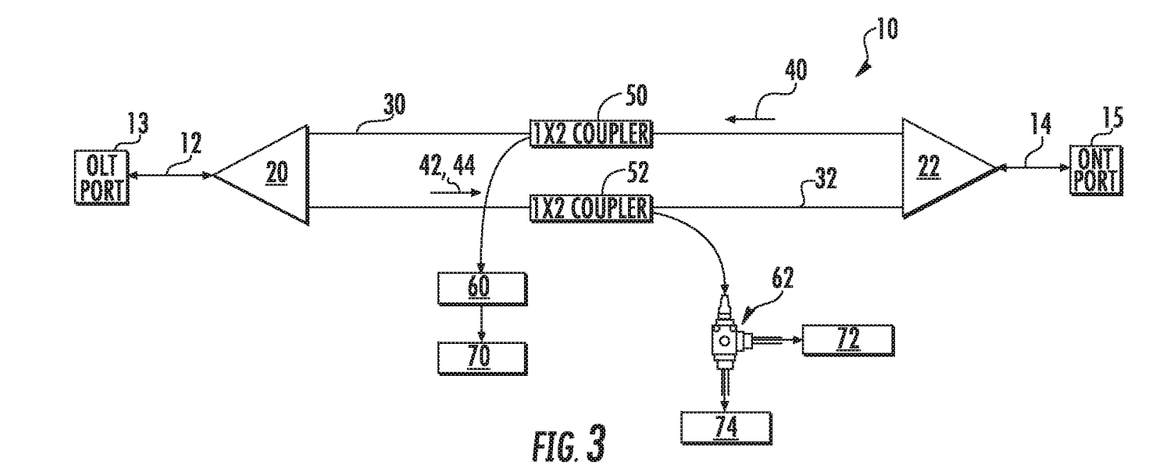
FIG. 3 is a schematic illustration of an apparatus for measuring optical power in accordance with other embodiments of the present disclosure.

In another embodiment, as illustrated in FIG. 3, a first optical signal 40 associated with a first wavelength may be carried by the first intermediate optical waveguide 30 in a first direction. A second optical signal 42 associated with a second wavelength different from the first wavelength may be carried by the second intermediate optical waveguide 32 in a second direction opposite the first direction. A third optical signal 44 associated with a third wavelength different from the first wavelength and the second wavelength may also be carried by the second intermediate optical waveguide 32 in the second direction.

Figure 4:
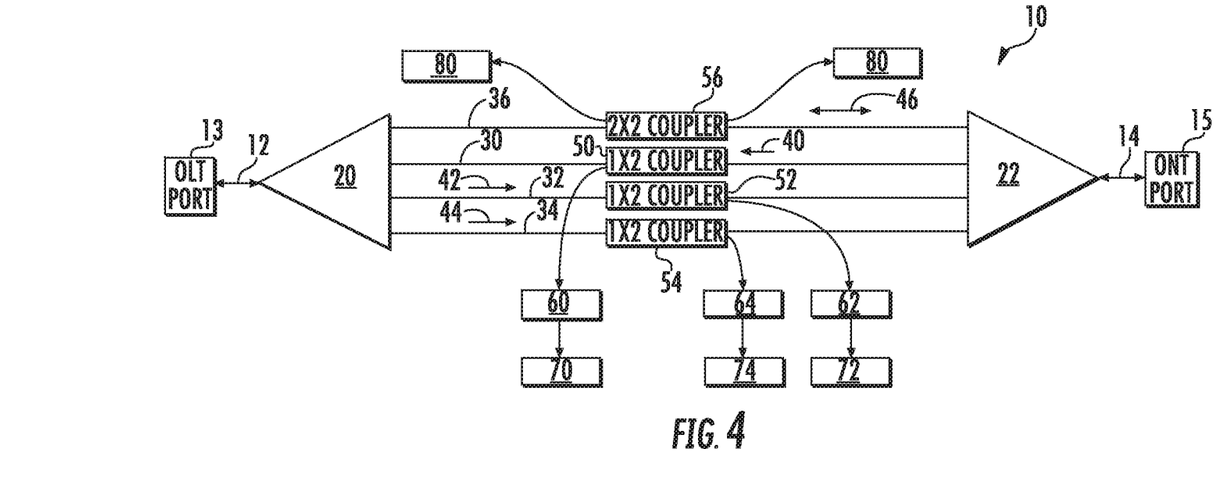
FIG. 4 is a schematic illustration of an apparatus for measuring optical power in accordance with other embodiments of the present disclosure.

In another embodiment, as illustrated in FIG. 4, a first optical signal 40 associated with a first wavelength may be carried by the first intermediate optical waveguide 30 in a first direction. A second optical signal 42 associated with a second wavelength different from the first wavelength may be carried by the second intermediate optical waveguide 32 in a second direction opposite the first direction. A third optical signal 44 associated with a third wavelength different from the first wavelength and the second wavelength may be carried by the third intermediate optical waveguide 34 in the second direction. A fourth optical signal 46 associated with a fourth wavelength different from the first, second, and third wavelengths may be carried by the fourth intermediate optical waveguide 36 in the first direction and/or second direction.

Figure 5:
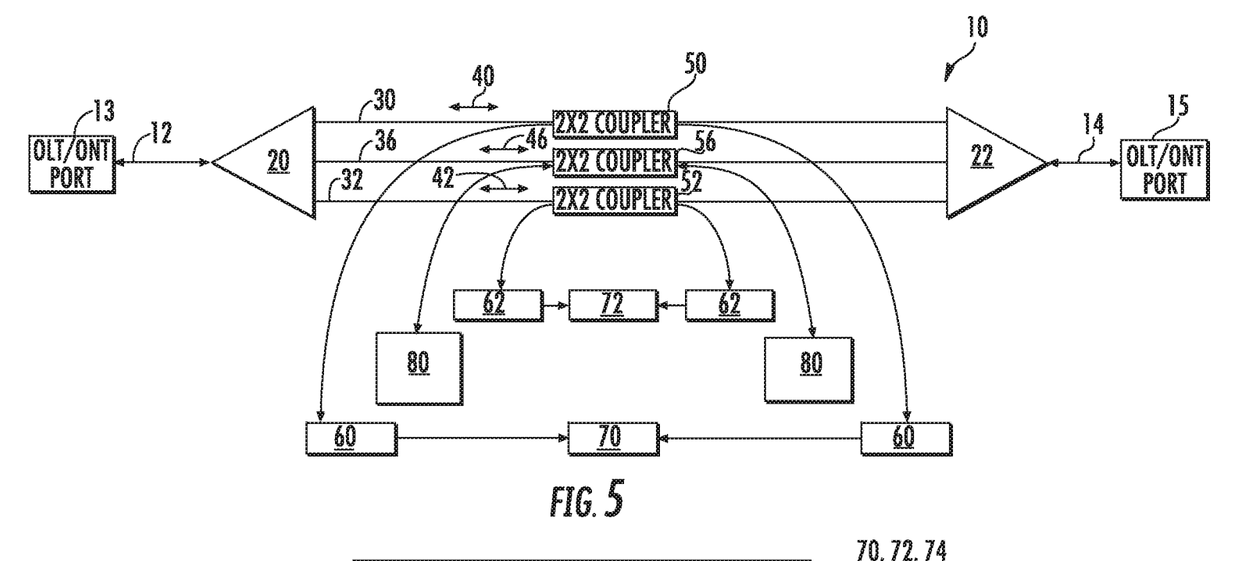
FIG. 5 is a schematic illustration of an apparatus for measuring optical power in accordance with other embodiments of the present disclosure.

In another embodiment, as illustrated in FIG. 5, a first optical signal 40 associated with a first wavelength may be carried by the first intermediate optical waveguide 30 in a first direction and/or second direction opposite the first direction. A second optical signal 42 associated with a second wavelength different from the first wavelength may be carried by the second intermediate optical waveguide 32 in the first direction and/or second direction. A fourth optical signal 46 associated with a fourth wavelength different from the first, second, and third wavelengths may be carried by the fourth intermediate optical waveguide 36 in the first direction and/or second direction.

In some embodiments, the components 20 and 22 may be configured to provide selected isolation levels of the optical signals 40, 42, and/or 44 of varying wavelengths which are complementary of each other to avoid crosstalk between the channels at each wavelength. For example, in some embodiments, the first component may have imbalanced isolation levels, e.g., the first component may be configured to have a first isolation level at the first wavelength and a second isolation level at the second wavelength, where the isolation levels are imbalanced in that the second isolation level is different from the first isolation level, and the second component 22 may be configured to have complementary isolation levels. When the isolation levels of the first component 20 and the isolation levels of the second component 22 are complementary, a total channel isolation may be provided at each wavelength which effectively suppresses potential interferometric noises within the operative wavelength range, while significantly narrowing the non-operative wavelength range.

When the components 20 and 22 have complementary isolation levels, the sum of the isolation levels at the first wavelength (e.g., the total isolation for the first optical signal 40 associated with the first wavelength) and the sum of the isolation levels at the second wavelength (e.g., the total isolation for the second optical signal 42 associated with the second wavelength) are approximately equal and each sum may be greater than or equal to a minimum isolation threshold. For example, the second component 22 may provide the second isolation level at the first wavelength and the first isolation level at the second wavelength. In some example embodiments, the first wavelength may be about one thousand five hundred fifty nanometers (1550 nm) and the second wavelength may be about one thousand three hundred ten nanometers (1310 nm). In one particular example, the first component 20 may provide the first isolation level of about thirty decibels (30 dB) isolation at the first wavelength and the second isolation level of about fifteen decibels (15 dB) isolation at the second wavelength, while the second component 22 may provide complementary isolation levels such as the second isolation level of about fifteen decibels (15 dB) isolation at the first wavelength and the first isolation level of about thirty decibels (30 dB) isolation at the second wavelength. In this example, the apparatus 10 will provide, at each wavelength, at least forty-five decibels (45 dB) channel isolation, whereby potential interferometric noises are effectively suppressed within the operative wavelength range of, in this example, from about 1270 nm to about 1500 nm and from about 1520 nm to about 1640 nm, while also providing a narrow non-operative wavelength range of between about 1500 nm and about 1520 nm. As used herein, terms of approximation such as "approximately," "generally" or "about" include values within ten percent of the stated value.

Optical couplers may be positioned along the intermediate optical waveguides to split portions of the various optical signals from such fibers. For example, a first optical coupler 50 may be positioned along the first intermediate optical waveguide 30 and configured to split a portion of the first optical signal 40 from the first intermediate optical waveguide 30. A second optical coupler 52 may be positioned along the second intermediate optical waveguide 32 and configured to split a portion of the second optical signal 42 (and, in some embodiments, third optical signal 44) from the second intermediate optical waveguide 32. A third optical coupler 54 may be positioned along the third intermediate optical waveguide 34 and configured to split a portion of the third optical signal 44 from the third intermediate optical waveguide 34. A fourth optical coupler 56 may be positioned along the fourth intermediate optical waveguide 36 and configured to split a portion of the fourth optical signal 46 from the fourth intermediate optical waveguide 36.

Any suitable portion of an optical signal may be split from an intermediate optical waveguide using an optical coupler. For example, in some embodiments, a coupler may be a 99:1 coupler, such that 1% of the signal is split from the intermediate optical waveguide. Alternatively, 98:2, 95:5, 90:10, or other suitable couplers may be utilized.

Further, in some embodiments as illustrated, one or more optical couplers may be unidirectional optical couplers (i.e. 1×2 optical couplers). Additionally or alternatively, as illustrated, one or more optical couplers may be bidirectional couplers (i.e. 2×2 optical couplers). Unidirectional optical couplers generally facilitate splitting of an optical signal when the signal is being carried in only one direction, while bidirectional optical couplers are direction agnostic and generally facilitate splitting of an optical signal when the signal is being carried in one direction or an opposite direction. In the embodiment illustrated in FIG. 1, the first, second, and third optical coupler 50, 52, 54 are unidirectional. In the embodiment illustrated in FIG. 2, the first, second, and third optical coupler 50, 52, 54 are bidirectional. In the embodiment illustrated in FIG. 3, the first and second optical coupler 50, 52 are unidirectional. In the embodiment illustrated in FIG. 4, the first, second, and third optical coupler 50, 52, 54 are unidirectional and the fourth optical coupler 56 is bidirectional. In the embodiment illustrated in FIG. 5, the first, second, and fourth optical coupler 50, 52, 56 are bidirectional.

In exemplary embodiments, optical couplers in accordance with the present disclosure are fused couplers, which are typically formed by melting together two optical fibers to bring the cores thereof together. Alternatively, however, other suitable optical couplers such as beam-splitters, wavelength division multiplexing couplers, thin-film filters, series of lenses/prisms, etc., may be utilized.

Apparatus 10 may further include a plurality of photodetectors. Each photodetector may be in optical communication with an optical coupler, such that the photodetector receives the portion of the optical signal split from the intermediate optical waveguide along which the optical coupler is positioned. For example, one or more first photodetectors 60 may be in optical communication with the first optical coupler 50 to receive the portion of the first optical signal 40 split from the first intermediate optical waveguide 30. One or more second photodetectors 62 may be in optical communication with the second optical coupler 52 to receive the portion of the second optical signal 42 (and, in some embodiments, the third optical signal 44) split from the second intermediate optical waveguide 32. One or more third photodetectors 64 may be in optical communication with the third optical coupler 54 to receive the portion of the third optical signal 44 split from the third intermediate optical waveguide 34.

In exemplary embodiments, each photodetector may include one or more band-pass filters. Such filter(s) may be integrated within the photodetector. The band-pass filter included in each photodetector may be calibrated to a specific frequency or frequency range of the optical signal received by the photodetector, such that only such frequency (s) pass through the filter.

As is generally understood, each photodetector may convert the optical signals received thereby to electrical signals. These electrical signals may then be communicated to measurement devices which measure the power of the electrical signals, which corresponds to the optical power of the optical signals. Accordingly, such measurement devices measure the optical signal(s) (i.e. the power thereof) from the associated photodetectors. For example, a first measurement device 70 may be configured to measure the first optical signal 40 from the first photodetector(s) 60. A second measurement device 72 may be configured to measure the second optical signal 42 from the second photodetector(s) 62. A third measurement device 74 may be configured to measure the third optical signal 44 from the second photodetector 62 or third photodetector(s) 64.

When only a single frequency on an intermediate optical waveguide is of concern or interest, the associated photodetector may be a single frequency photodetector which is in communication with a single measurement device. Alternatively, when multiple frequencies on an intermediate optical waveguide are of concern or interest, the associated photodetector may be a multiple frequency photodetector which is in communication with multiple measurement devices (such as one measurement device for each frequency). For example, in the embodiment illustrated in FIG. 3, the second photodetector 62 is a dual photodetector which receives the portion of the second optical signal 42 and third optical signal 44 split from the second intermediate optical waveguide 32. In this embodiment, the second photodetector 62 is in communication with the second and third measurement devices 72, 74. The second measurement device 72 may measure the second optical signal 42 (i.e. the power thereof), and the third measurement device 74 may measure the third optical signal 44 (i.e. the power thereof).

Figure 6:
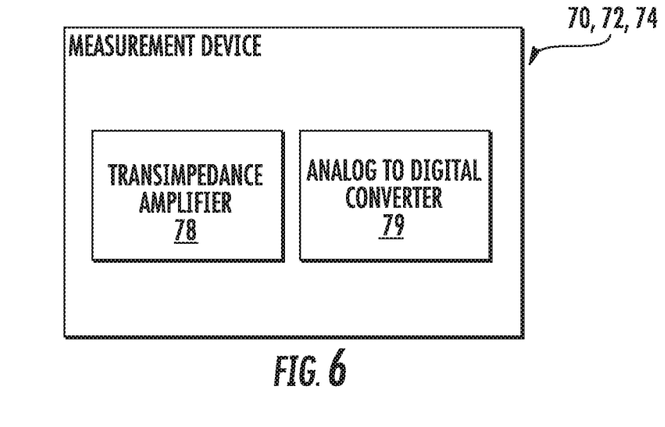
FIG. 6 is a schematic illustration of a measurement device for use in an apparatus for measuring optical power in accordance with embodiments of the present disclosure.

Any suitable measurement device may be utilized. Referring briefly to FIG. 6, in exemplary embodiments, a suitable measurement device includes a transimpedance amplifier 78 and/or analog to digital converter 79. Alternatively, other suitable measurement devices may be utilized.

Apparatus 10 in accordance with the present disclosure need not be limited to uses for power measurement purposes only. For example, as discussed, in some embodiments a fourth intermediate optical waveguide 36 carrying a fourth optical signal 46 is provided. A fourth optical coupler 56 is positioned along the fourth intermediate optical waveguide 36. Rather than connecting to a photodetector and measurement device, however, the fourth optical coupler 56 may connect to one or more other suitable components. For example, in some embodiments, the fourth optical coupler 56 may be in optical communication with one or more ports 80. A port 80 may, for example, be an optical light source ("OLS") port for connection to an OLS; an optical time-domain reflectometer ("OTDR") port for connection to an OTDR; a Protocol Analyzer port for connection to a Protocol Analyzer; or a BER Tester port for connection to a BER Tester.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for measuring optical power, the apparatus comprising:
    a first component configured to at least one of multiplex or demultiplex between a first composite optical waveguide and at least a first intermediate optical waveguide and a second intermediate optical waveguide, wherein the first intermediate optical waveguide carries a first optical signal associated with a first wavelength, wherein the second intermediate optical waveguide carries a second optical signal associated with a second wavelength different from the first wavelength, and wherein the first component provides isolation levels comprising a first isolation level at the first wavelength and a second isolation level different from the first isolation level at the second wavelength;
    a second component configured to at least one of multiplex or demultiplex between a second composite optical waveguide and at least the first intermediate optical waveguide and the second intermediate optical waveguide, wherein the second component provides isolation levels which are complementary to the isolation levels of the first component;
    a first optical coupler positioned along the first intermediate optical waveguide, the first optical coupler configured to split a portion of the first optical signal from the first intermediate optical waveguide;
    a second optical coupler positioned along the second intermediate optical waveguide, the second optical coupler configured to split a portion of the second optical signal from the second intermediate optical waveguide;
    a first photodetector in optical communication with the first optical coupler to receive the portion of the first optical signal split from the first intermediate optical waveguide;
    a second photodetector in optical communication with the second optical coupler to receive the portion of the second optical signal split from the second intermediate optical waveguide;
    a first measurement device configured to measure the first optical signal from the first photodetector; and
    a second measurement device configured to measure the second optical signal from the second photodetector.

2. The apparatus of claim 1, wherein the first optical signal travels along the first intermediate optical waveguide in a first direction and the second optical signal travels along the second intermediate optical waveguide in a second direction that is opposite to the first direction.

3. The apparatus of claim 1, wherein the first photodetector and second photodetector each include a band-pass filter.

4. The apparatus of claim 1, wherein the first component and the second component are combination multiplexer and demultiplexer components.

5. The apparatus of claim 4, wherein the first component and the second component are filter wavelength division combination multiplexer and demultiplexer components.

6. The apparatus of claim 4, wherein the first component and the second component are arrayed wavelength grating combination multiplexer and demultiplexer components.

7. The apparatus of claim 1, wherein the first measurement device and second measurement device each includes a transimpedance amplifier and analog to digital converter.

8. The apparatus of claim 1, wherein the first coupler and second coupler are unidirectional couplers.

9. The apparatus of claim 1, wherein the first coupler and second coupler are bidirectional couplers.

10. The apparatus of claim 1, wherein the second intermediate optical waveguide further carries a third optical signal associated with a third wavelength different from the first wavelength and the second wavelength, wherein the second photodetector is a dual photodetector, and further comprising a third measurement device configured to measure the third optical signal from the second photodetector.

11. The apparatus of claim 1, wherein the first component is further configured to at least one of multiplex or demultiplex between the first composite optical waveguide and a fourth intermediate optical waveguide,
    wherein the fourth intermediate optical waveguide carries a fourth optical signal associated with a fourth wavelength different from the first and the second wavelength,
    wherein the second component is further configured to at least one of multiplex or demultiplex between the second composite optical waveguide and the fourth intermediate optical waveguide,
    further comprising a fourth optical coupler positioned along the fourth intermediate optical waveguide, the fourth optical coupler configured to split a portion of the fourth optical signal from the fourth intermediate optical waveguide, and
    wherein one of an OLS port, OTDR port, Protocol Analyzer port, or BER Tester port is in optical communication with the fourth optical coupler.

12. An apparatus for measuring optical power, the apparatus comprising:
    a first combination multiplexer and demultiplexer component in optical communication between a first composite optical waveguide and at least a first intermediate optical waveguide and a second intermediate optical waveguide, wherein the first intermediate optical waveguide carries a first optical signal associated with a first wavelength in a first direction, and wherein the second intermediate optical waveguide carries a second optical signal associated with a second wavelength different from the first wavelength in a second direction that is opposite to the first direction, wherein the first combination multiplexer and demultiplexer component provides isolation levels comprising a first isolation level at the first wavelength and a second isolation level different from the first isolation level at the second wavelength;
    a second combination multiplexer and demultiplexer component in optical communication between a second composite optical waveguide and at least the first intermediate optical waveguide and the second intermediate optical waveguide, wherein the second combination multiplexer and demultiplexer component provides isolation levels which are complementary to the isolation levels of the first component;

a first optical coupler positioned along the first intermediate optical waveguide, the first optical coupler configured to split a portion of the first optical signal from the first intermediate optical waveguide;

a second optical coupler positioned along the second intermediate optical waveguide, the second optical coupler configured to split a portion of the second optical signal from the second intermediate optical waveguide;

a first photodetector in optical communication with the first optical coupler to receive the portion of the first optical signal split from the first intermediate optical waveguide, the first photodetector comprising a band-pass filter;

a second photodetector in optical communication with the second optical coupler to receive the portion of the second optical signal split from the second intermediate optical waveguide, the second photodetector comprising a band-pass filter;

a first measurement device configured to measure the first optical signal from the first photodetector; and a second measurement device configured to measure the second optical signal from the second photodetector.

13. The apparatus of claim 12, wherein the first component and the second component are filter wavelength division combination multiplexer and demultiplexer components.

14. The apparatus of claim 12, wherein the first component and the second component are arrayed wavelength grating combination multiplexer and demultiplexer components.

15. The apparatus of claim 12, wherein the first measurement device and second measurement device each includes a transimpedance amplifier and analog to digital converter.

16. The apparatus of claim 12, wherein the first coupler and second coupler are unidirectional couplers.

17. The apparatus of claim 12, wherein the first coupler and second coupler are bidirectional couplers.

18. The apparatus of claim 12, wherein the second intermediate optical waveguide further carries a third optical signal associated with a third wavelength different from the first wavelength and the second wavelength, wherein the second photodetector is a dual photodetector, and further comprising a third measurement device configured to measure the third optical signal from the second photodetector.

19. The apparatus of claim 12, wherein the first component is further in optical communication between the first composite optical waveguide and a fourth intermediate optical waveguide, wherein the fourth intermediate optical waveguide carries a fourth optical signal associated with a fourth wavelength different from the first and the second wavelength, wherein the second component is further in optical communication between the second composite optical waveguide and the fourth intermediate optical waveguide, further comprising a fourth optical coupler positioned along the fourth intermediate optical waveguide, the fourth optical coupler configured to split a portion of the fourth optical signal from the fourth intermediate optical waveguide, and wherein one of an OLS port, OTDR port, Protocol Analyzer port, or BER Tester port is in optical communication with the fourth optical coupler.

\* \* \* \* \*